R. GOLDSCHMIDT.
STRENGTHENING ELECTRIC ALTERNATING CURRENTS.
APPLICATION FILED APR. 6, 1911.

1,043,923. Patented Nov. 12, 1912.

WITNESSES:
John C. Sanders
Arthur S. Pettit

INVENTOR:
Rudolf Goldschmidt
BY
ATT'Y.

UNITED STATES PATENT OFFICE.

RUDOLF GOLDSCHMIDT, OF DARMSTADT, GERMANY.

STRENGTHENING ELECTRIC ALTERNATING CURRENTS.

1,043,923.   Specification of Letters Patent.   Patented Nov. 12, 1912.

Application filed April 6, 1911. Serial No. 619,205.

*To all whom it may concern:*

Be it known that I, RUDOLF GOLDSCHMIDT, a subject of the Grand Duke of Hessen, and a citizen of the German Empire, also a resident of Darmstadt, have invented certain new and useful Improvements in Strengthening Electric Alternating Currents, the principles of which are set forth in the following specification and accompanying drawings.

This invention relates to a method for the strengthening of weak electric alternating currents, especially such as are employed in telegraphy and telephony, the said method being designed mainly for making flow very large quantities of alternating current energy by means of small quantities of such energy, this being moreover effected as far as possible in such manner that the large secondary currents produced are directly proportional to the small primary potentials or electromotive forces.

This method is applicable to all kinds of telegraphy or telephony, in which messages are to be transmitted over great distances.

When it is desired to make flow large electric powers by means of small ones, this is usually effected by causing the latter to serve for the excitation of the magnetic field of a mechanically driven electric machine, and taking off the large power from the armature of this machine. When it is desired to dispose with a commutator, it becomes necessary to employ alternating currents and consequently either a synchronous or asynchronous alternating current generator. Whether however a synchronous generator or an asynchronous generator of the usual kind be employed, the energy requisite for excitation is very considerable and amounts to a large percentage of the useful output.

Figure 1:
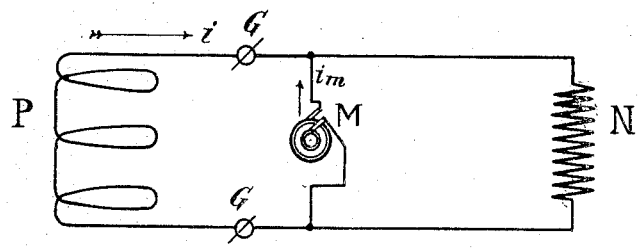
Figure 5:
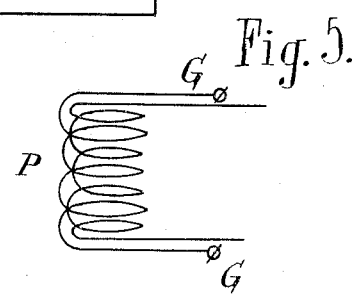
Figure 2:
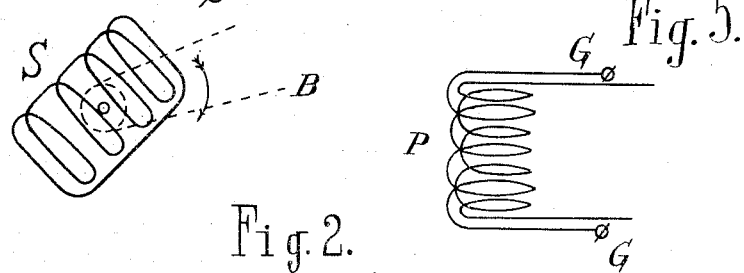
Figure 4:
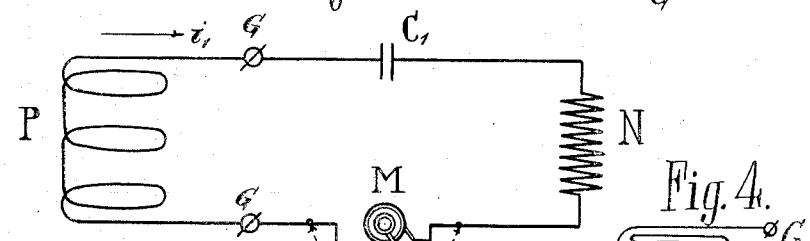
Figure 3:
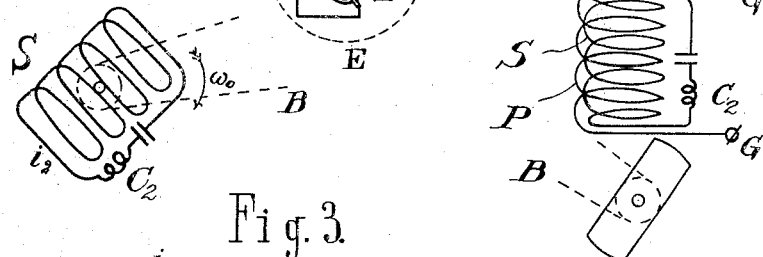

In the accompanying drawing: Figure 1 is a diagram of a primary station provided with an asynchronous alternating current generator that lacks syntonizing means combined with a primary machine and a working resistance, said machine and resistance being connected in parallel; Fig. 2 a similar diagram showing the syntonizing means, while the primary machine and resistance are connected in series; Fig. 3 a diagram similar to Fig. 2 showing the parts connected in parallel; Fig. 4 a modification of the asynchronous alternating current generator, and Fig. 5 a further modification thereof.

Fig. 1 diagrammatically illustrates by way of example an asynchronous machine in which P is the primary winding, S the short-circuited secondary winding, which in this case, is the rotor-winding, and is moved hyper-synchronously in relation to P by pulley belt B.

M is the weak primary machine which must be assumed to be a synchronous machine, as the ordinary asynchronous generator cannot work without such a machine, as it is only capable of producing watt currents.

N is the working resistance, say, a receiving or transmitting apparatus while the letters G indicate the terminals of the primary windings.

For magnetizing the asynchronous machine P, a considerable wattless current is required, which is more particularly true when working with high frequencies, and consequently the useful current $i$ supplied by generator P will be small when compared with the magnetizing current $i_m$ furnished by the primary machine. The gain due to the insertion of the asynchronous machine in the manner described would thus be but slight and might even result in an absolute loss.

Now the present invention relates to an asynchronous generator wherein both the secondary circuit S and the stator are syntonized. The behavior of the asynchronous generator will be very different from that just referred to more especially when the rotor is syntonized to the "slip frequency," provided, of course, that the slip is correctly chosen. That this will be the case is obvious from the following considerations:— When for instance a current of a periodicity of 1000 per second (alternating speed $w_1 = 2\pi \cdot 1000 = 6280$) is sent into it from the primary machine M and primary winding P (Fig. 2) and when the rotor winding S is at first rotated in the magnetic field produced by the primary winding with synchronous speed ($w_1$), there will be produced in the rotor winding $S_1$ which is assumed to be monophase, a single electromotive force with the alternating speed $2w_1$, corresponding to a periodicity of 2000. By increasing the speed $w_0$ of the rotor by 5 per cent., there will be produced in winding S two electromotive forces, one of the alternating speed $w_0 + w_1$, (periodicity 2050) and a second of the alternating speed $w_0 - w_1$ (slip frequency equal to a periodicity of 50). If the winding were a polyphase winding, it would not be possible to produce the high frequency of 2050 periods. Polyphase current is only rarely employed either in telegraphy or telephony and as the theoretically simpler case need not here be considered at length.

Let the secondary circuit be so syntonized by means of choking coils and condensers $C_2$ that in practice there can flow only currents of the alternating speed $w_0-w_1$ corresponding to a periodicity of 50 per second, while currents of the alternating speed $w_0+w_1$ corresponding to a periodicity of 2050, are suppressed on account of their lack of resonance. If now the arrangements are such that in the primary circuit there can flow only currents of the alternating speed $w_1$ we have $$(1)\quad i_2 = \frac{\text{const.}}{R_2} i_1.(w_0-w_1)$$

wherein $i_1$ represents the primary current, $i_2$ the secondary current, and $R_2$ the rotor impedance.

This equation indicates that, the machine being a constant element, the secondary current is proportional to the primary current $i$, and the alternating speed $w_0-w_1$ and inversely proportional to the equivalent rotor impedance $R_2$ including the condenser losses and the like. The secondary current $i_2$ reacts on the primary circuit P and produces therein an electromotive force of $E_1$ of the frequency $w_1$ in accordance with the equation:—

$$(2)\quad E_1 = \text{const.}\, i_2.w_1$$

Substituting equation 1 in equation 2 gives $$(3)\quad E_1 = \frac{\text{const.}}{R_2} \cdot i_1.(w_0-w_1).w_1$$

When E is the electromotive force due to the primary source of current the entire electromotive force in P will be $E+E_1$; both of these being coincident in phase. Consequently, when $R_1$ = primary impedance, inclusive of working resistance, there is $$(4)\quad i_1 = \frac{E}{R_1} + \frac{E_1}{R_1}$$

When for $E_1$ there is substituted the value from (3)

$$(5)\quad i_1 = \frac{E}{R_1} + \frac{\text{const.}}{R_1.R_2}.i_1.(w_0-w_1)w_1$$

and for this we obtain $$(6)\quad i_1 = \frac{E}{R_1 - \frac{\text{const.}}{R_2}.(w_0-w_1).w_1}$$

When the slip $$\frac{w_0-w_1}{w_1} = 0$$

(synchronous rotary speed) or when the rotor circuit is broken, there will be produced a current $$i_1 = \frac{E}{R_1},$$

that is to say, of very small value since it has been assumed that E itself is very small. The primary impedance is by the rotation of S decreased to:

$$R'_1 = R_1 - \frac{\text{const.}}{R_2}(w_0-w_1).w_1.$$

The resistance of the primary circuit becomes equal to zero at a certain slip:

$$\frac{w_0-w_1}{w_1} = \frac{R_1.R_2}{\text{const. }w_1^2}$$

In the case of this "resonance-slip" there takes place, as it were, a resonance between the resistance and the asynchronous generator. This produces an electromotive force which is always equal to the fall of potential in the resistance. It follows therefrom that theoretically, when the appropriate slip for resonance is employed, a pulsating electromotive force B of corresponding frequency, no matter how small, in the primary generator M should suffice to produce a practically unlimited current and that consequently a degree of sensitiveness has been obtained superior to that of any other arrangement. In practice the current is however limited by the saturation and the heating of the machine. The character of the asynchronous generator has in fact been entirely changed, it becomes self-exciting, when the slip grows larger than the resonance-slip, as in the case of a self-exciting direct current machine wherein the speed of rotation exceeds the critical speed.

When the slip is somewhat less than that required for the resistance-resonance, that is to say, before the commencement of the independent self-excitation proper, the output of the machine will be completely controlled by the small pulsating electromotive force E.

In the case of telephony the electromotive force E will be microphonically influenced at the transmitting station, by which means considerable quantities of energy can be converted into waves immediately after the pulsation.

In the case of the reception of telephonic or telegraphic messages the strengthening machine is located at the secondary station; the primary generator M being located at the primary station.

The currents which are received or sent out can either be used directly or they can be converted into currents of suitable higher or lower potential or frequency.

The herein described machine for strengthening weak currents is primarily designed to serve as a telephonic relay and is consequently intended to be connected up with the telephone, no matter where the latter is to be used, or by what means the transmission of the signs is to be effected. Any kind of apparatus or device suitable for the reception or transmission of signs can be used in combination with the asynchronous strengthening machine. The two windings instead of being relatively movable, may be both stationary, their self-induction or their mutual induction being varied, which is the really essential point, by means of a rotating iron core. In this case, the two windings may be combined to form a single winding.

The result produced is the same, whether the primary generator M has the form of a synchronous generator, an electric arc, or a spark-generator. It might generally be most advantageous to employ a synchronous machine proper, as the electromotive force supplied by it is absolutely constant. The asynchronous generator and the working resistance can be connected with the primary generator M either in series (Fig. 2), or in parallel (Fig. 3). The apparatus may be connected with the circuit either directly or inductively. The primary generator M and the working resistance N may also be connected with separate windings arranged on the strengthening machine. The primary generator and the asynchronous generator may be mounted on the same shaft and may even have an iron core either wholly or partially common to both of them.

For the purpose of this invention, the employment of stationary primary and secondary windings and of a rotary windingless iron core is to be considered an equivalent of a stationary primary winding and a rotary secondary winding or vice versa.

What I claim is:—

1. The method of generating and increasing alternating currents suitable for sending and receiving telegraphic and telephonic messages which consists in passing an alternating current through a primary winding, and varying hypersynchronously the coefficient of mutual induction between said primary winding and a syntonized secondary winding.

2. Method of generating and increasing alternating currents suitable for sending and receiving telegraphic and telephonic messages which consists in passing an alternating current through a primary winding, and rotating hypersynchronously a syntonized secondary winding in the field of the primary winding.

3. Method of generating powerful alternating currents arising from weak alternating currents which consists in passing an alternating current through a primary winding, and rotating a syntonized secondary winding in the field of said primary winding at a speed at which the electromotive force generated in the primary winding becomes substantially equal to the drop of voltage caused by the resistance of the primary winding, the primary electromotive force thus controlling the amount of energy obtained.

4. Apparatus for generating and increasing alternating currents for the purpose described, comprising a primary generator for producing alternating current, an asynchronous generator having a primary winding in circuit with said primary generator and having a secondary winding, means whereby that secondary winding may be rotated hypersynchronously relatively to the primary winding, and syntonizing means in the circuit of the secondary winding.

In testimony whereof I affix my signature in presence of two witnesses.

RUDOLF GOLDSCHMIDT.

Witnesses:
 WOLDEMAR HAUPT,
 HENRY HASPER.